United States Patent
Peng et al.

(10) Patent No.: US 8,343,681 B2
(45) Date of Patent: Jan. 1, 2013

(54) BIPOLAR PLATE AND FUEL CELL STACK INCLUDING THE SAME

(75) Inventors: Jie Peng, Yongin-si (KR); Jae-young Shin, Yongin-si (KR); Seung-jae Lee, Yongin-si (KR); Tae-won Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 12/176,585

(22) Filed: Jul. 21, 2008

(65) Prior Publication Data

US 2009/0110991 A1   Apr. 30, 2009

(30) Foreign Application Priority Data

Dec. 28, 2007   (KR) .................. 10-2007-0140673

(51) Int. Cl.
*H01M 8/04* (2006.01)
*H01M 8/10* (2006.01)
*H01M 8/24* (2006.01)

(52) U.S. Cl. ......... 429/454; 429/455; 429/458; 429/483

(58) Field of Classification Search .............. 429/30, 429/34, 38, 39, 35, 13, 210, 454, 455, 483, 429/458

See application file for complete search history.

(56) References Cited

U.S. PATENT DOCUMENTS

| 5,763,113 | A  | * | 6/1998 | Meltser et al. ............... 429/432 |
| 5,945,229 | A  | * | 8/1999 | Meltser ...................... 429/431 |
| 6,117,577 | A  | * | 9/2000 | Wilson ........................ 429/17 |
| 6,174,616 | B1 | * | 1/2001 | Marvin et al. ................. 429/34 |
| 2004/0013929 | A1 | * | 1/2004 | Hsu et al. .................... 429/34 |
| 2006/0115705 | A1 | * | 6/2006 | Choi et al. ................... 429/38 |
| 2007/0015035 | A1 | * | 1/2007 | Izenson et al. ................. 429/38 |
| 2007/0111089 | A1 |   | 5/2007 | Swan |
| 2008/0050638 | A1 |   | 2/2008 | Peng et al. |

FOREIGN PATENT DOCUMENTS

| JP | 07-029579 | 1/1995 |
| JP | 07-249420 | 9/1995 |
| JP | 2001-043872 | 2/2001 |
| KR | 10-0745742 | 7/2007 |

* cited by examiner

*Primary Examiner* — Jonathan Crepeau
*Assistant Examiner* — Kenneth Douyette
(74) *Attorney, Agent, or Firm* — Stein McEwen, LLP

(57) ABSTRACT

Bipolar plates and a fuel cell stack having the bipolar plates. The fuel cell stack includes membrane electrode assemblies (MEAs), and first and second bipolar plates sequentially stacked between the MEAs. The bipolar plates include: flow channels formed on opposing surfaces thereof; four manifolds connected to the flow channels; and through holes to connect to the manifolds of the bipolar plates adjacent thereto.

4 Claims, 12 Drawing Sheets

BIPOLAR PLATE AND FUEL CELL STACK INCLUDING THE SAME

CROSS-REFERENCE TO RELATED APPLICATION

This application claims the benefit of Korean Application No.2007-140673, filed Dec. 28, 2007, in the Korean Intellectual Property Office, the disclosure of which is incorporated herein by reference.

BACKGROUND OF THE INVENTION

1. Field of the Invention

Aspects of the present invention relate to a polymer electrolyte membrane fuel cell (PEMFC), and more particularly, to a PEMFC having an increased current density and an improved temperature distribution.

2. Description of the Related Art

A fuel cell is an electric generator that converts chemical energy of a fuel into electrical energy, through a chemical reaction. A fuel cell can continuously generate electricity, as long as fuel is supplied.

A polymer electrolyte membrane fuel cell (PEMFC) includes a fuel cell stack, in which unit cells are stacked in series. Each unit cell includes: a cathode and an anode, which are respectively formed on either side of an electrolyte membrane; and two plates having flow channels to supply an oxidant (oxygen in air) to the cathode, and a hydrogen fuel to the anode. The plate can be a bipolar plate, in which the flow channels are formed on both sides thereof, to respectively supply the air and fuel to the cathode and the anode, which contact the plate.

FIG. 1 is a perspective view of the structure of a conventional unit cell. Referring to FIG. 1, the unit cell includes a membrane electrode assembly (MEA) comprising an electrolyte membrane 2 disposed between an anode 1 and a cathode 3. A pair of bipolar plates 10 are disposed on opposing sides of the MEA. Flow channels 11, through which a hydrogen fuel is supplied to the anode 1, are formed on one side of the bipolar plates 10, and flow channels 12, through which air is supplied to the cathode 2, are formed on an opposing side of the bipolar plates 10. The stacking of such unit cells forms a fuel cell stack.

Each bipolar plate 10 includes a fuel inlet 11a, a fuel outlet 11b, an inlet manifold 13a disposed between the fuel inlet 11a and the flow channel 11, and an outlet manifold 13b disposed between the flow channel 11 and the fuel outlet 11b. Each bipolar plate 10 also includes an oxidant inlet 12a, an oxidant outlet 12b, an inlet manifold 14a disposed between the oxidant inlet 12a and the flow channel 12, and an outlet manifold 14b disposed between the low channel 12 and the fuel outlet 12b.

A gasket 30 to seal the unit cell is interposed between the bipolar plates 10. The leakage of the fluids from the flow channels 11 and 12 is prevented, by placing the MEA 20 on a central portion of the bipolar plate 10, and then attaching the gasket 30 to edges of the bipolar plates 10.

FIGS. 2A and 2B are cross-sectional views of the manifolds of the first and second bipolar plates 10. As schematically illustrated in FIG. 2A, the gasket 30 is disposed between the manifold 13a and the manifold 14a. Since the gasket 30 is formed of an elastic material, the gasket 30 may block the manifolds 13a, 13b, 14a, and 14b. That is, as illustrated in FIG. 2B, for example, if the gasket 30 is bent towards the manifold 13a, the gasket 30 can block a portion of the manifold 13a and the flow channel 11.

Conventional bipolar plates have a thickness of approximately 1 cm, and are relatively deep. Thus, even if the gasket 30 is slightly bent, the gasket 30 cannot completely block the manifold 13a and the flow channel 11. However, if the thickness of the conventional bipolar plates is reduced to a few mm, the blocking of the manifolds 13a, 13b, 14a, and 14b can occur. In particular, if the electrolyte membrane 2 swells, by absorbing water during a fuel cell reaction, the gasket 30 cannot be rigidly supported, and thus, there is high possibility that the gasket 30 can be pushed into one of the manifolds 13a, 13b, 14a, and 14b, and then stuck on an inner wall of one of the manifolds. In this case, fluids cannot freely flow through the flow channels 11 and 12, resulting in abnormal operation of the fuel cell.

In order to address the problem described above, as depicted in FIG. 3, a metal bridge plate 40 is used to cover the manifolds 13a, 13b, 14a, and 14b. A step 15 is formed in each of the manifolds 13a, 13b, 14a, and 14b, and the metal bridge plate 40 is disposed on the step 15. Then, the gasket 30 is attached to the metal bridge plate 40. In this way, the airtightness of the manifolds 13a, 13b, 14a, and 14b is maintained, and the blocking of the manifolds 13a, 13b, 14a, and 14b, due to the gasket 30, is prevented. However, the size of the manifolds 13a, 13b, 14a, and 14b is reduced by the metal bridge plate 40, resulting in flow restrictions. Also, the unit cells become more complicated, and the metal bridge plate 40 may corrode over time.

In a PEMFC having the conventional bipolar plate 10, if impurities are present in the hydrogen fuel and/or the oxidant, the concentration of hydrogen and oxidant is reduced along the flow paths, and as a result, the current density is reduced along the flow paths. Also, heat flux generated in the MEA is related to the current density, and thus, the temperature can decrease along the flow paths. In particular, a large amount of $CO_2$ or CO can be mixed into the hydrogen fuel supplied to a PEMFC that is operated at a high temperature, and air can be used as the oxidant, and thus, the current density and thermal density can be non-uniform.

SUMMARY OF THE INVENTION

To address the above and/or other problems, aspects of the present invention provide a fuel cell stack having improved fluid flow paths that can provide a uniform current density and thermal density, in a fuel cell stack, in which a plurality of bipolar plates are stacked.

According to an aspect of the present invention, there is provided a fuel cell stack including membrane electrode assemblies (MEAs), first bipolar plates, and second bipolar plates, which are sequentially disposed between the MEAs. The bipolar plates include flow channels formed on opposing surfaces thereof, four manifolds connected to flow channels, and through holes to connect to manifolds of adjacent ones of the bipolar plates.

According to an aspect of the present invention, the flow directions of fuel in the first bipolar plates and in the second bipolar plates may differ from each other.

According to an aspect of the present invention, the fuel may be discharged from the fuel cell stack after passing through the flow channels of the bipolar plates.

According to an aspect of the present invention, the fuel may be recirculated to the flow channels of the second bipolar plates, after passing through the flow channels of the first bipolar plates.

According to an aspect of the present invention, the fuel cell stack may further comprise an end plate formed on an upper portion of the fuel cell stack. The end plate comprises a connection unit that connects two manifolds of one of the bipolar plates.

According to an aspect of the present invention, a bipolar plate may comprise: a plate main body having a first flow channels and second flow channels formed on opposing surfaces thereof; a first manifold that supplies a fluid to the first flow channels, through the plate main body; a second manifold that discharges the fluid from the first flow channels; a third manifold that supplies a fluid to the second flow channels, through the plate main body; a fourth manifold that discharges the fluid from the second flow channels; and through holes that connect to manifolds of adjacent bipolar plates.

According to an aspect of the present invention, the bipolar plate may include connection channels to connect the flow channels to the manifolds. The connection channels may comprise: first channels formed on a first surface of the bipolar plate, which are connected to one of the manifolds; through holes that are connected to the first channels, and which pass through the bipolar plate; and second channels formed on an opposing second surface of the bipolar plate, which connect the through holes to the flow channels.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated, from the following description of the exemplary embodiments, taken in conjunction with the accompanying drawings, of which.

DETAILED DESCRIPTION OF THE EMBODIMENTS

Figure 1:
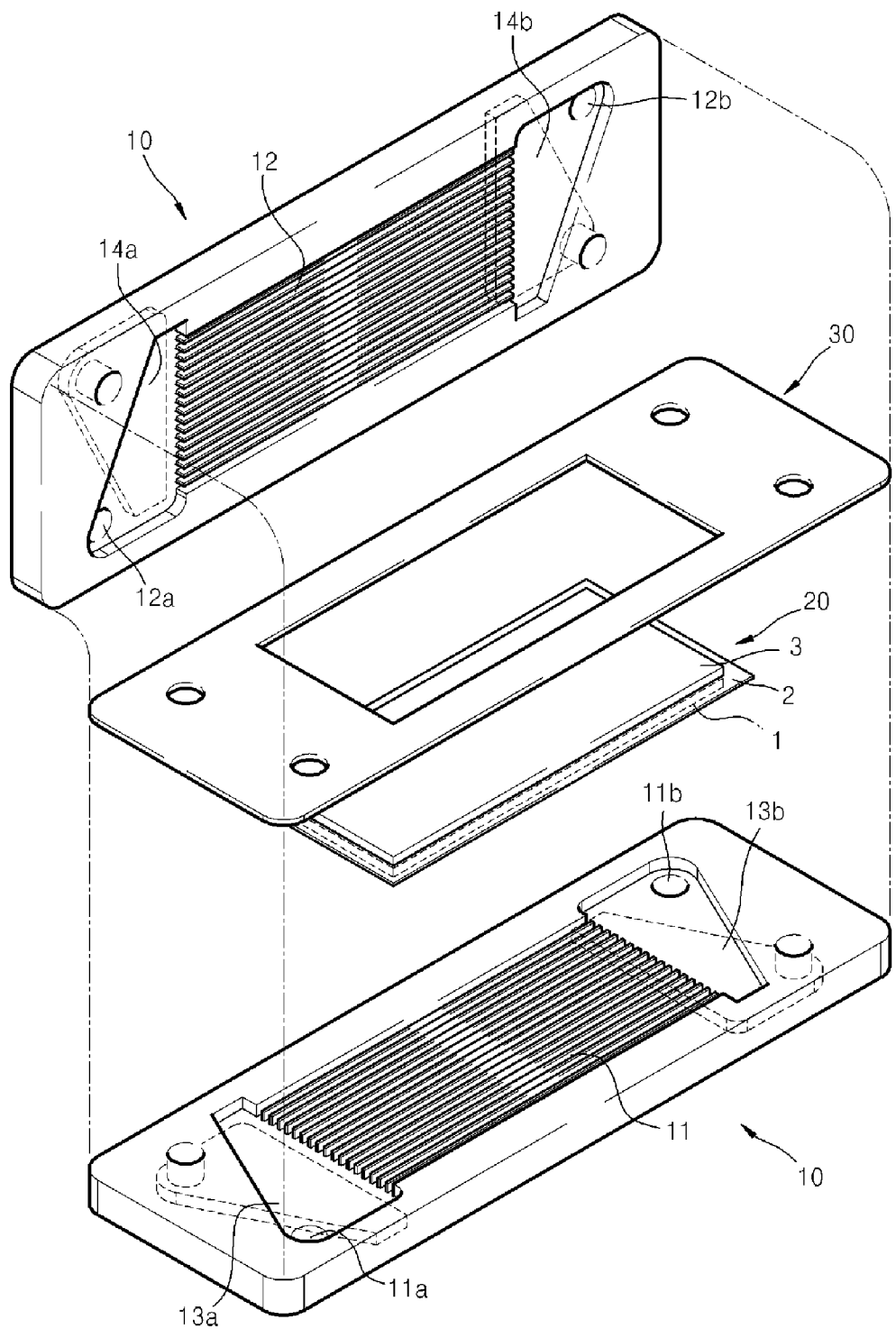
FIG. 1 is a perspective view of a structure of a conventional unit cell.
Figure 2A:
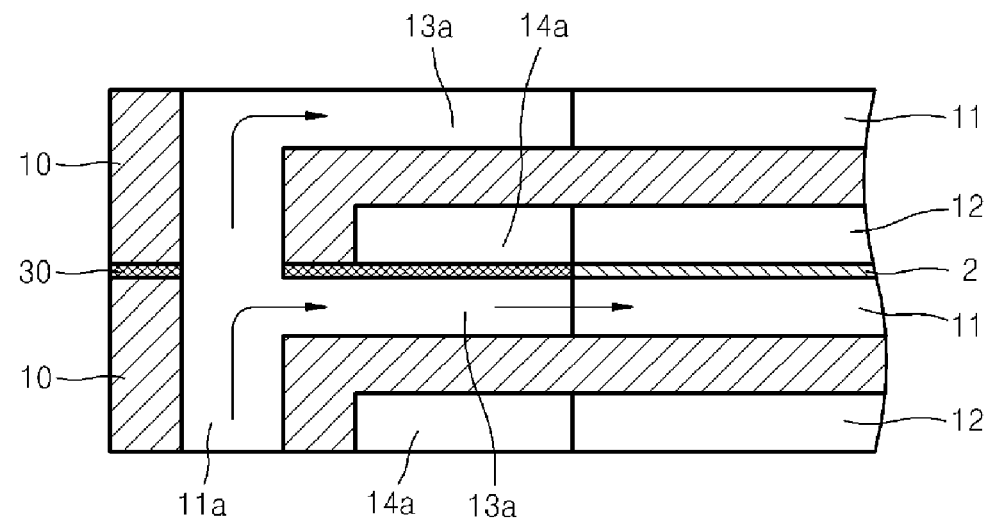
FIGS. 2A and 2B are cross-sectional views of manifolds of a first and second bipolar plate of the conventional unit cell of FIG. 1.
Figure 2B:
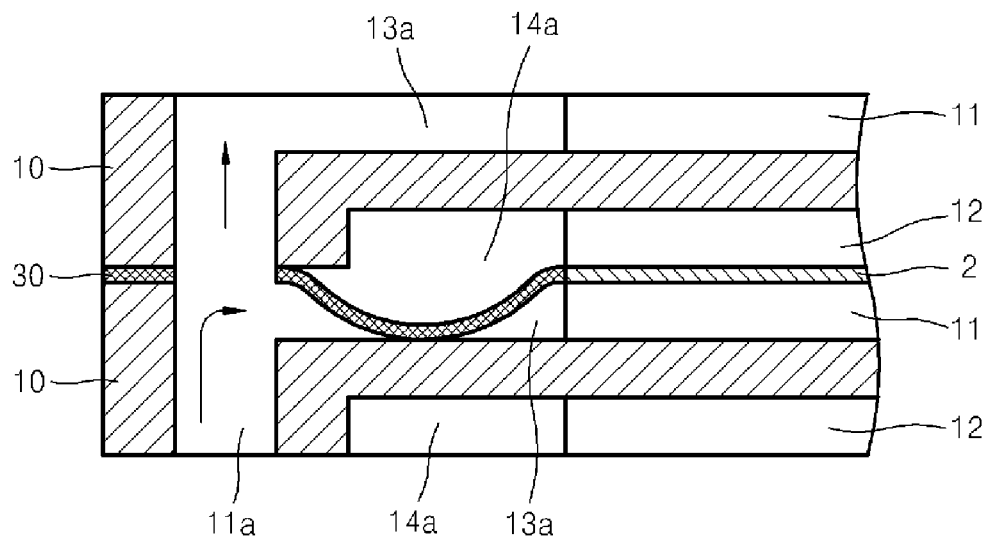
Figure 3:
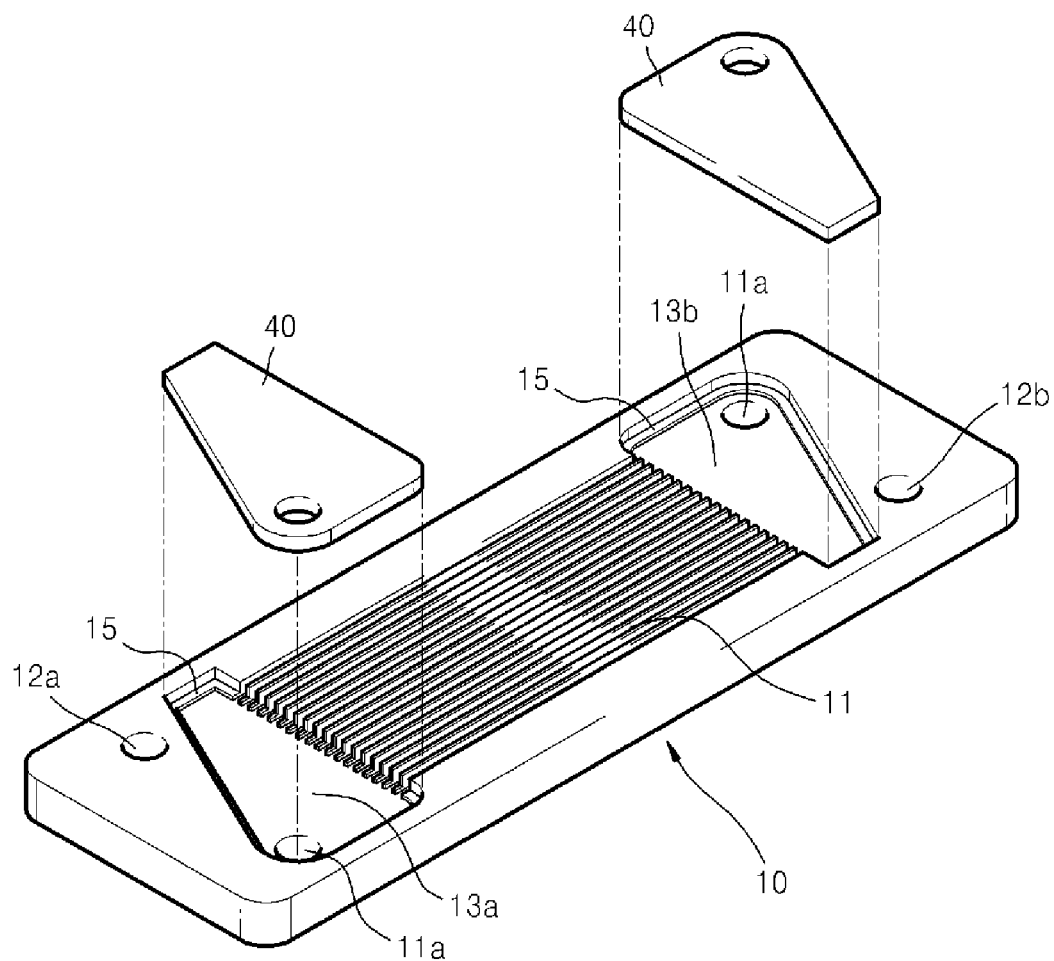
FIG. 3 is an exploded perspective view of another conventional bipolar plate.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 4:
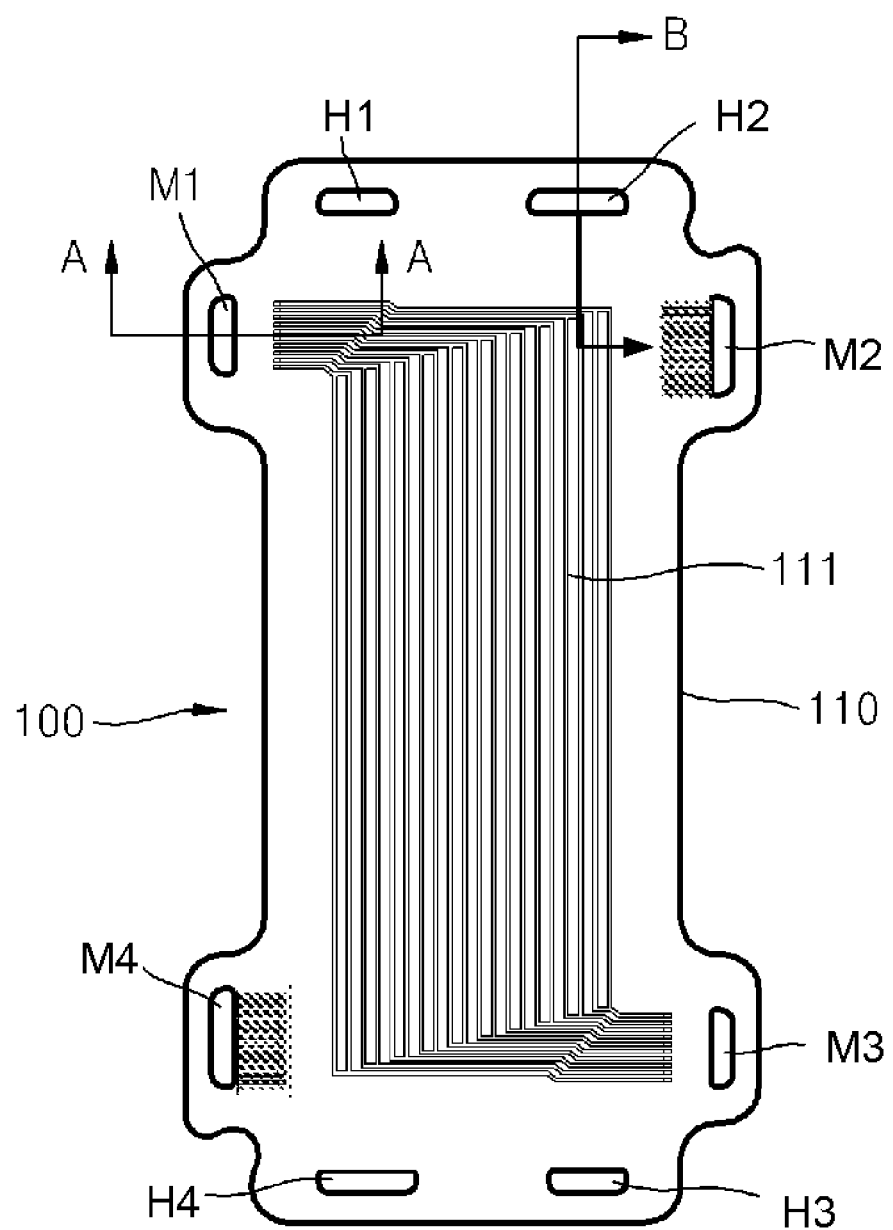
FIG. 4 is a plan view of a bipolar plate to be employed in a fuel cell stack, according to an exemplary embodiment of the present invention.
Figure 5:
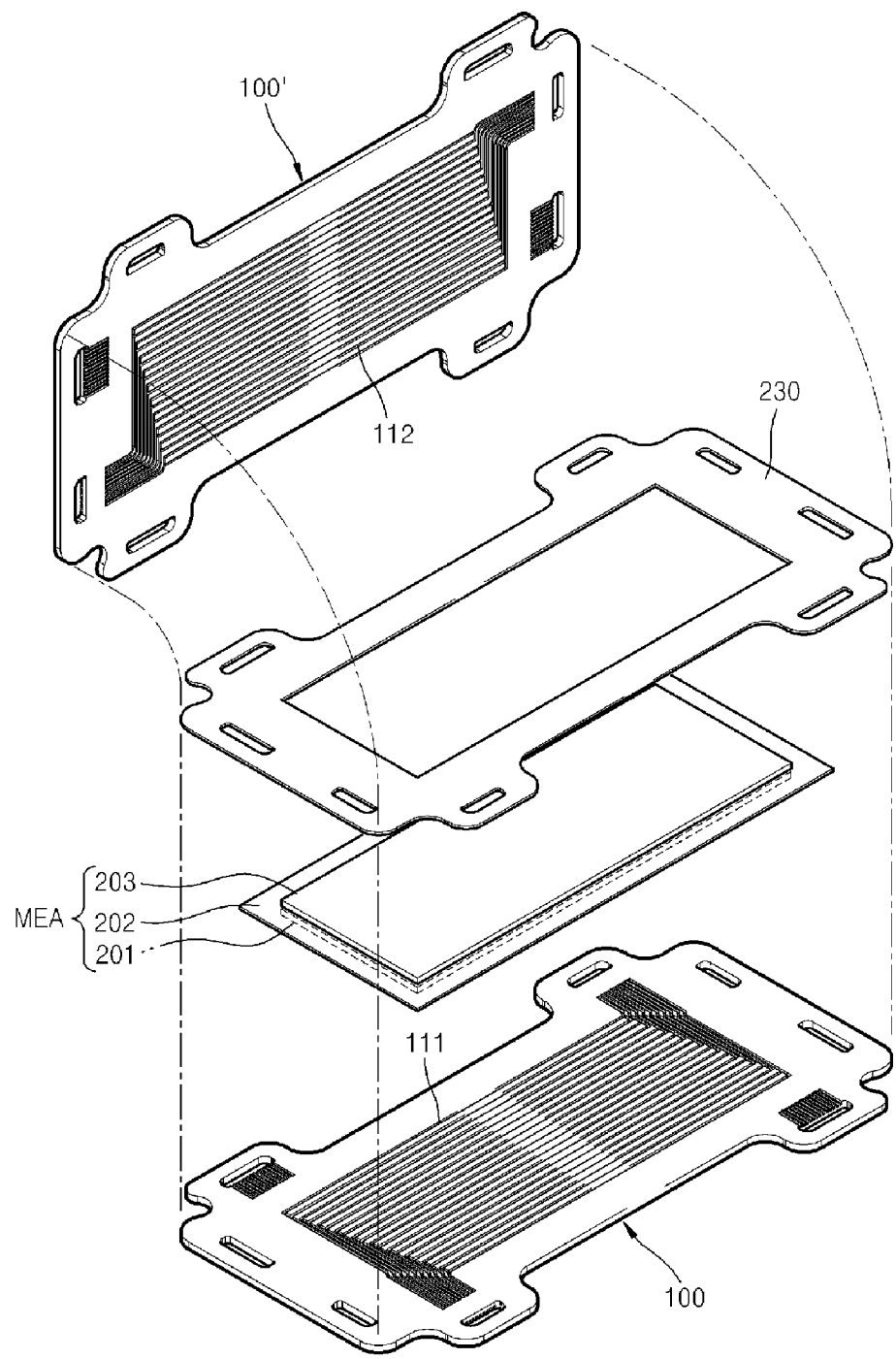
FIG. 5 is an exploded perspective view of a unit cell of a fuel cell stack, according to an exemplary embodiment of the present invention.

FIG. 4 is a plan view of a bipolar plate 100 to be employed in a fuel cell stack, according to an exemplary embodiment of the present invention. FIG. 5 is an exploded perspective view of a unit cell 500 of a fuel cell stack, according to an exemplary embodiment of the present invention.

Referring to FIGS. 4 and 5, the unit cell 500 includes a membrane electrode assembly (MEA) disposed between first and second bipolar plates 100 and 100', which are sealed by a gasket 230. The MEA includes an anode 201, a cathode 203, and an electrolyte membrane 202 disposed therebetween. The bipolar plates 100 and 100' each include flow channels 111 and 112, which are formed on opposing sides of a main body 110. A fuel is supplied through the flow channels 111 to the anode 201, and an oxidant, such as oxygen in air, is supplied through the flow channels 112 to the cathode 203. The fuel can be hydrogen, or a hydrogen-containing fuel.

Manifolds M1-M4 are formed near edges of the bipolar plates 100 and 100', for the ingress and egress of the fuel and oxidant to/from the flow channels 111 and 112. The manifolds M1-M4 extend through the bipolar plates 100 and 100'. Holes H1-H4 (through holes) are formed through edges of the bipolar plates 100 and 100'. The fuel and oxidant pass through the holes H1-H4 to the manifolds of adjacent bipolar plates 100 and 100'. The holes H1-H4 of each bipolar plate 100 and 100' are not directly connected to the flow channels 110 and 111 of the same bipolar plate. The gasket 230 has holes that correspond to the manifolds M1-M4 and the holes H1-H4.

Figure 6:
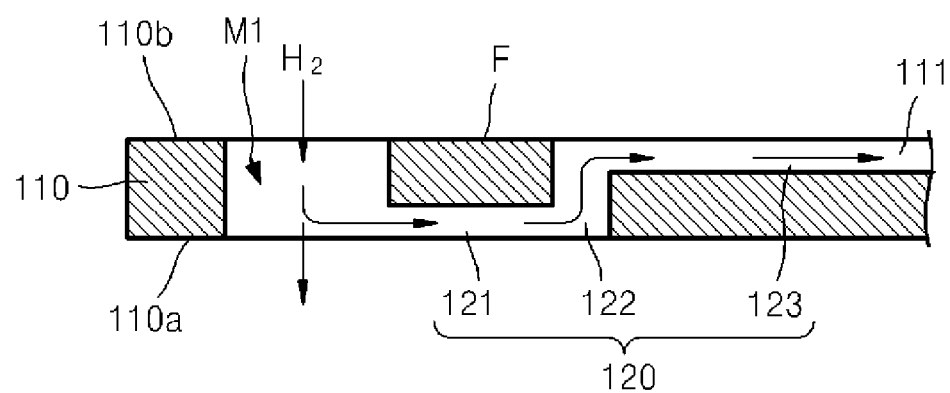
FIG. 6 is a cross-sectional view taken along a line A-A of FIG. 4, according to an exemplary embodiment of the present invention.
Figure 7:
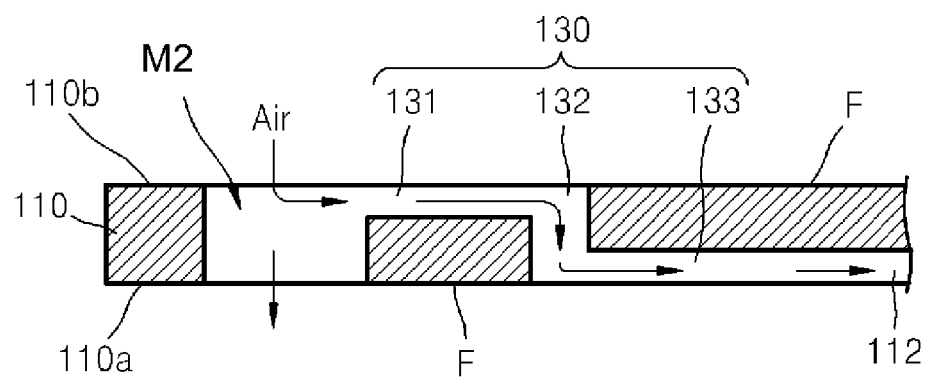
FIG. 7 is a cross-sectional view taken along a line B-B of FIG. 4, according to an exemplary embodiment of the present invention.

FIG. 6 is a cross-sectional view taken along line A-A of FIG. 4, and FIG. 7 is a cross-sectional view taken along line B-B of FIG. 4. Referring to FIG. 6, the manifold M1 is connected to connection channels 120 that lead to the flow channels 111. The connection channels 120 each include: first channels 121 that are formed on a first surface 110a of a main body 110 of the bipolar plate 100, and which extend orthogonally with respect to the flow channels 111 and 112; through holes 122 that extend vertically from ends of the first channels 121; and second channels 123 that are formed on a second surface 110b of the main body 110, which connect the through holes 122 to the flow channels 111.

Fuel is supplied to the manifold M1, then passes through the connection channels 120 and the flow channels 111, and then leaves the main body 110 through the manifold M3, after passing in a reverse order through other connection channels that are similar to the above described connection channels 120. That is, the connection channels 120 are formed on both the first and second surfaces 110a and 110b, via the through holes 122. Since a flat surface F is formed at a portion of the second surface 110b corresponding to the first channels 121, and grooves having narrow gaps are formed in the second channels 123, the second channels 123 may not be blocked, even if a gasket 300 is attached to the second channels 123.

Referring to FIG. 7, the plate main body 110 is configured such that the oxidant (oxygen from air) that enters the manifold M2, flows along first channels 131 formed on the second surface 110b of the plate main body 110, and then moves to the first surface 110a, via through holes 132 and second channels 133, so as to be supplied to the flow channels 112. The oxidant that passes through the flow channels 112 leaves the plate main body 110, through the manifold M4, after passing in a reverse order through other connection channels that have the same shape as the connection channels 130. Since a flat surface F is formed at a portion of the second surface 110b, corresponding to the second channels 133, and grooves having narrow gaps are formed in the first channels 131, the first channels 131 may not be blocked, even if the gasket 300 is attached on the first channels 131.

Figure 8:
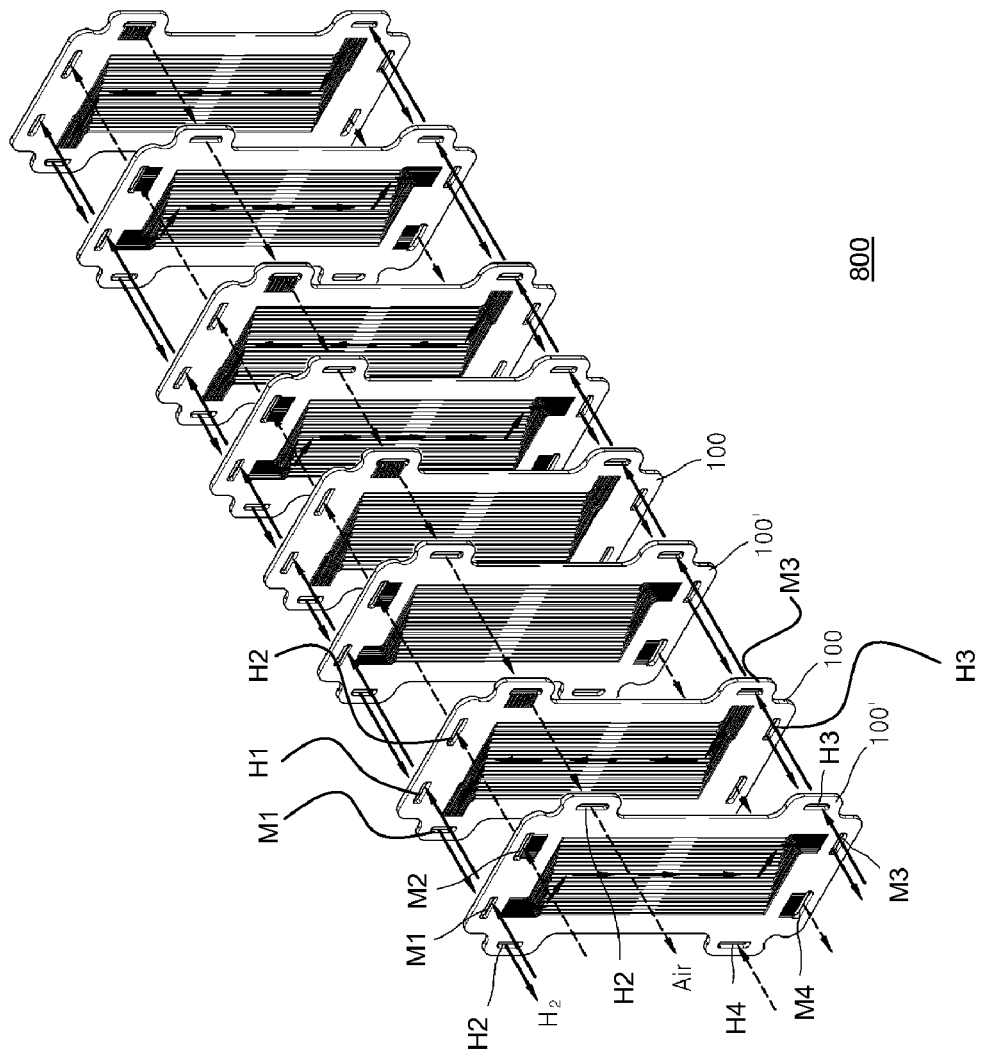
FIG. 8 is an exploded perspective view illustrating a stack structure of bipolar plates in a fuel cell stack, according to an exemplary embodiment of the present invention.

FIG. 8 is an exploded perspective view showing the structure of bipolar plates 100 and 100' in a fuel cell stack 800, according to an exemplary embodiment of the present invention. For convenience of drawing, gaskets and MEAs are omitted in FIG. 8. End plates formed on both ends of a fuel cell stack 800 are also omitted.

Referring to FIG. 8, the first and second bipolar plates 100 and 100' are alternately disposed along the fuel cell stack 800. The fuel ($H_2$) flows to the manifolds M1 of the second bipolar plates 100', via the holes H1 of the first bipolar plates 100. The fuel is then is distributed to the flow channels 111. Any residual fuel that is not delivered to the MEAs from the flow channels 111 is collected in the manifolds M3, and then flows to one end of the fuel cell stack 800, via the holes H3 of the first bipolar plates 100. Similarly, the oxidant (air) flows to the manifolds M2 of the second bipolar plates 100', via the holes H2 of the first bipolar plates 100, and then is collected, in the manifolds M4 of the second bipolar plates 100', and the flows through the holes H4 of the first bipolar plates 100.

The fuel and oxidant flow to the first bipolar plates 100 in a similar fashion, except that the fuel is delivered to the manifolds M3 of the first bipolar plates 100, via the holes H3 of the second bipolar plates 100'. The fuel is collected from the manifolds M1 of the first bipolar plates, via the holes H1 of the second bipolar plates 100'. In addition, the oxidant flows to the manifolds M4 of the first bipolar plates 100, and is collected from the manifolds M2 of the first bipolar plates 100, via the holes H4 and H2 of the second bipolar plates 100'. In other words, the fuel and oxidant flow through the flow channels 111 and 112 of the first bipolar plates 100 in a first direction, and flow through the flow channels 111 and 112 of the second bipolar plates 100' in a second direction, which generally opposes the first direction.

Figure 9:
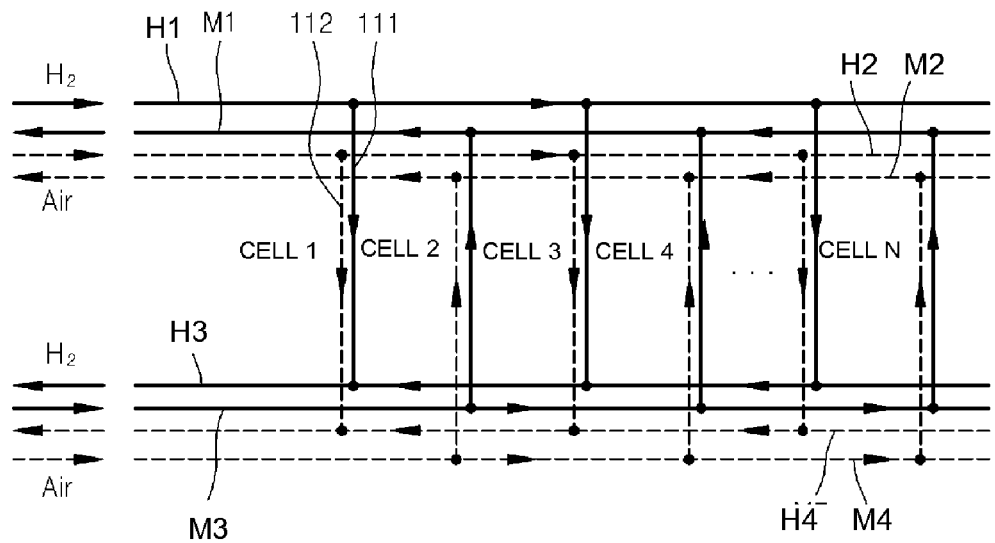
FIG. 9 is a simple drawing for illustrating the flow of fluids in the fuel cell stack of FIG. 8, according to an exemplary embodiment of the present invention.

FIG. 9 illustrates the flow of fluids in the bipolar plates 100 and 100' of the fuel cell stack 800, according to an exemplary embodiment of the present invention. Referring to FIGS. 8 and 9, in two adjacent unit cells, fuel and oxidant flow in opposite directions. The fuel and oxidant flow in the same direction, in a single unit cell.

Figure 10:
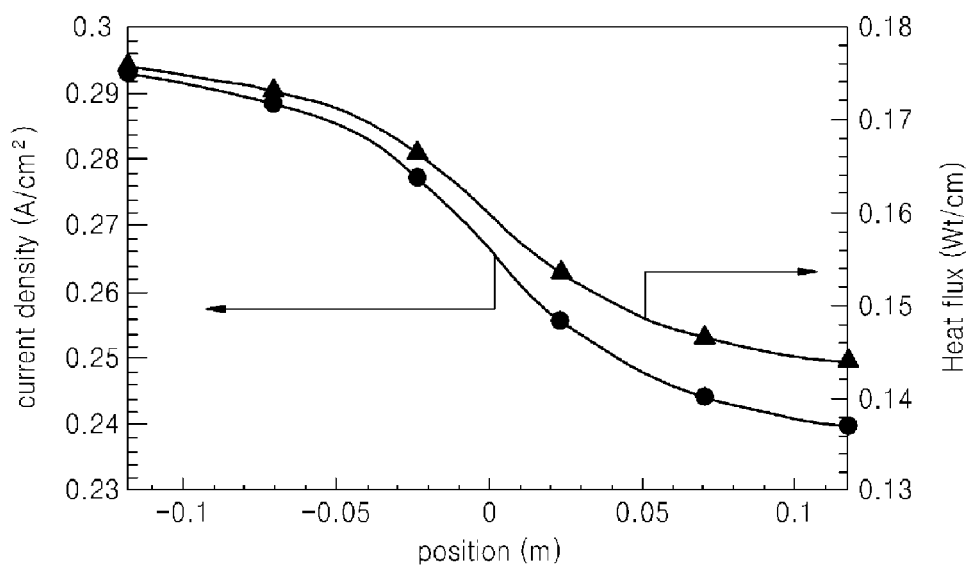
FIG. 10 is a graph showing a variation of current density and heat flux along a flow path in a fuel cell comprising the conventional bipolar plate of FIG. 1.

FIG. 10 is a graph showing the variation of current density and heat flux, along a flow path in a fuel cell comprising the conventional bipolar plate of FIG. 1. Referring to FIG. 10, the current density and heat flux gradually decrease, from the inlet to the outlet of the flow channel. The current density is not uniform along the bipolar plate, and a large amount of heat is generated at the inlets of the fuel. Thus, the performance of the fuel cell stack can decrease, and also, the lifespan of the fuel cell stack can decrease, due to localized overheating at the inlets of the flow channels.

Figure 11:
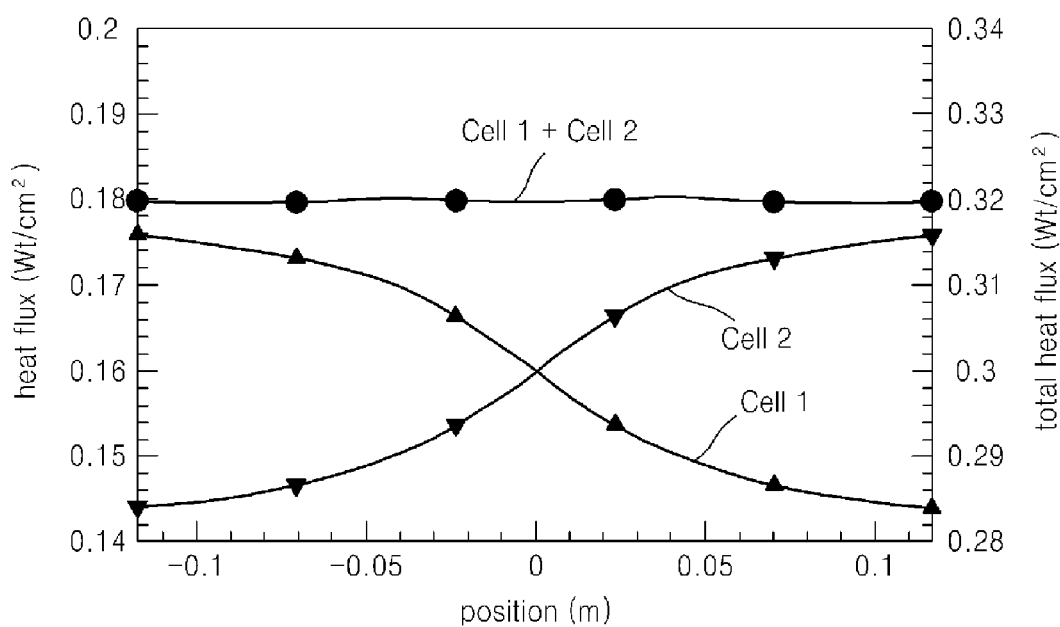
FIG. 11 is a graph showing a variation of current density and heat flux along a flow path in a fuel cell comprising the fuel cell stack of FIG. 8, according to an exemplary embodiment of the present invention.

FIG. 11 is a graph showing the variation of current density and heat flux along a flow path in a fuel cell comprising the fuel cell stack 800. Referring to FIG. 11, since the fluids flow in different directions in the unit cell 1 and the unit cell 2, the heat flux in the unit cell 1 increases, and the heat flux in the unit cell 2 decreases, due to the positions of the associated bipolar plates. Thus, a total heat flux of the adjacent unit cells is uniform regardless of position, and thus, a localized overheating does not occur. As a result, the lifetime reduction of the fuel cell, due to thermal damage, does not occur. Also, although not shown in FIG. 11, the sum of the current densities in the unit cell 1 and the unit cell 2 can be uniform.

Figure 12:
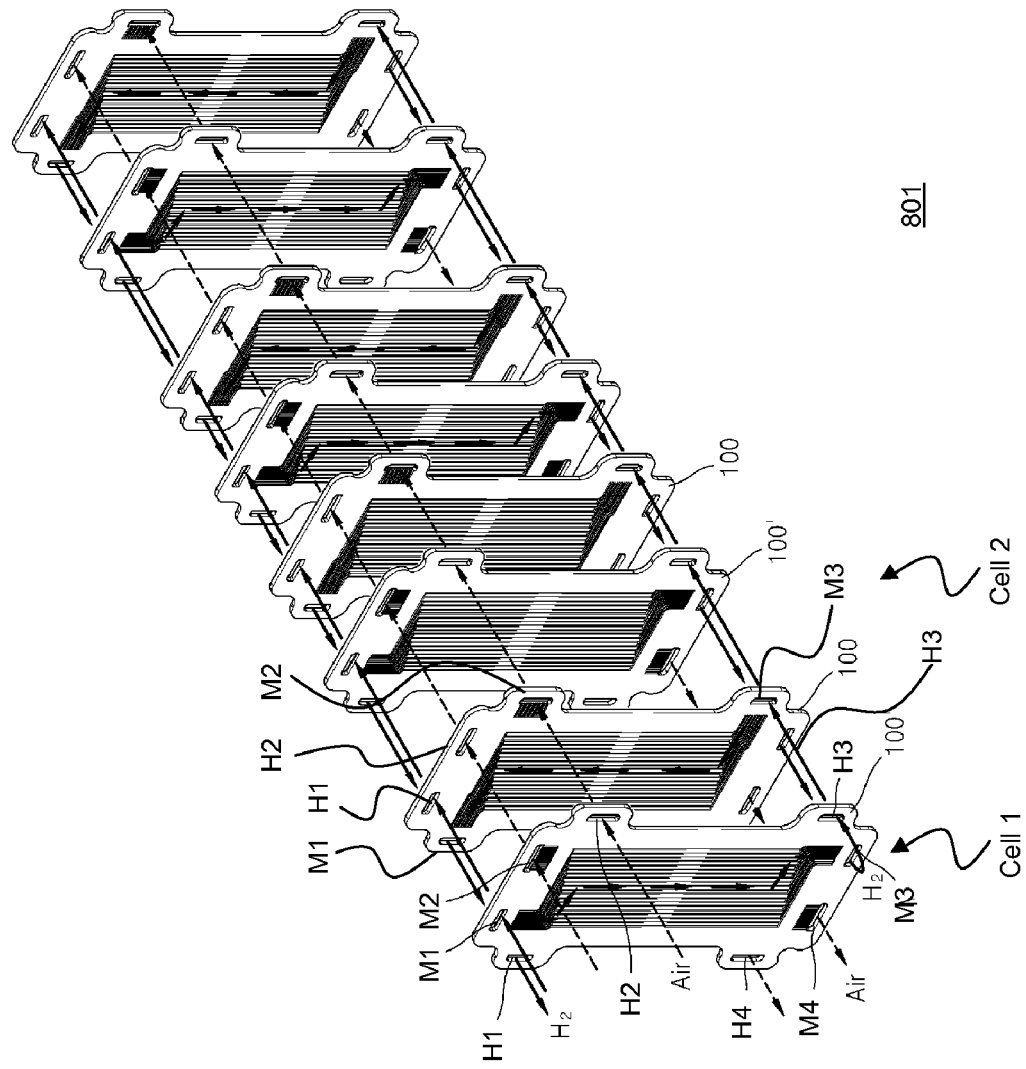
FIG. 12 is drawing for illustrating a flow of fluids in a fuel cell stack, according to another exemplary embodiment of the present invention.
Figure 13:
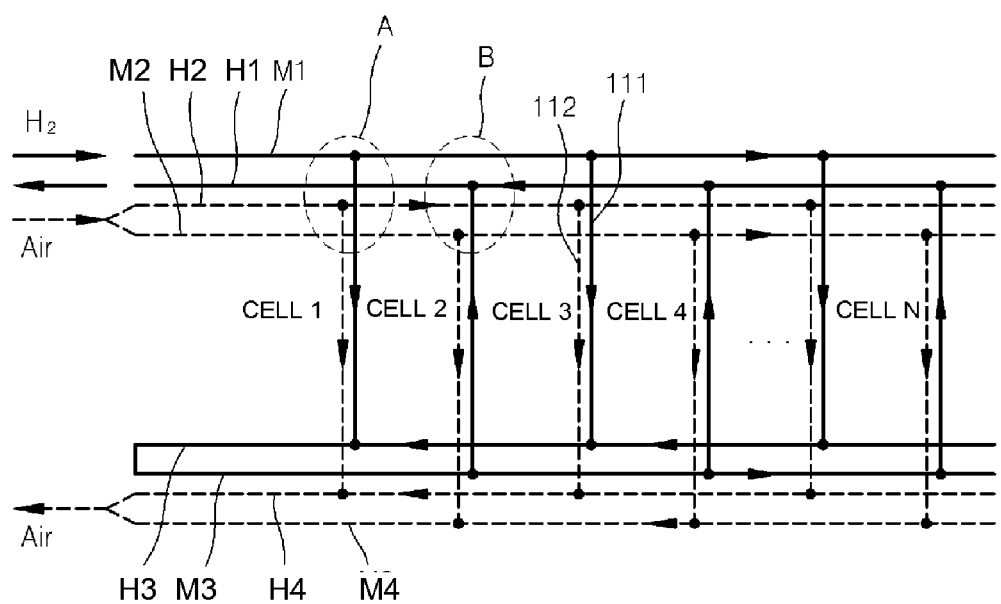
FIG. 13 is a drawing for illustrating the flow of fluids in the fuel cell stack of FIG. 12, according to an exemplary embodiment of the present invention.
Figure 14:
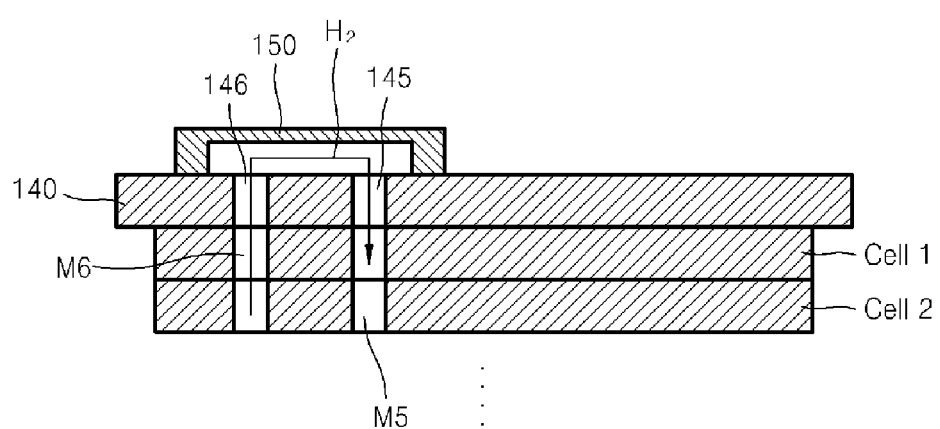
FIG. 14 is a cross-sectional view of a structure of an end plate employed in the fuel cell stack of FIG. 12, according to an exemplary embodiment of the present invention.

FIG. 12 is a drawing showing the flow of fluids in a fuel cell stack 801, according to another exemplary embodiment of the present invention. In FIG. 12, for convenience of drawing, a gasket, MEAs, and end plates are omitted. Referring to FIG. 12, the first bipolar plates 100 and the second bipolar plates 100' are alternately installed in the fuel cell stack 801. FIG. 13 illustrates the flow of fluids in the fuel cell stack 801. FIG. 14 shows an end plate 140 and a connection unit 150.

Referring to FIGS. 12-14, the fuel cell stack 801, and the flow of fuel and oxidant therein, are similar to that of the fuel cell stack 800, so only difference therebetween will be described herein. After passing through the flow channels 112 of the second bipolar plates 100', the fuel is collected in the manifolds M3, and then flows to the end plate 140 (FIG. 14). The fuel flows through the end plate 140, and is then recirculated to the first bipolar plates 100, via the hole H3 of the leftmost second bipolar plate 100', by the connection unit 150.

The oxidant flows into the fuel cell stack 801 in a first direction, and flows out of the fuel cell stack 801 in a second direction, which generally opposes the first direction. In adjacent unit cells, for example cell 1 and cell 2, the fuel flows through the flow channels 111 in opposite directions, and the oxidant flows through the flow channels 112 in the same direction. The fuel enters the fuel cell stack 801 through the manifold M1 of the cell 1, flows through the manifolds of the second bipolar plates 100', and then is collected at the manifold M3 of the cell 1, before entering the endplate 140.

In FIG. 14, the endplate 140 includes holes 146 and 145 that respectively correspond to the manifold M3 and the hole H3 of the unit cell 1. The connection unit 150 covers the holes 146 and 145. The connection unit 150 directs the fuel from the hole 146 into the hole 145, such that the fuel is recirculated to the fuel cell stack 801. Thus, the path through which the fuel flows in the fuel cell 801 stack is elongated, and a greater percentage of the fuel can be utilized. Accordingly, the amount of the fuel exhausted from the fuel cell stack 801 decreases.

In FIG. 13, the portion A is a hydrogen fuel inlet, where the amount of heat flux is the highest. However, in the unit cell 2, the portion B is a hydrogen fuel outlet, where the heat flux is the lowest. Thus, the heat flux of the entire fuel cell stack 801 can be uniform. In particular, at the portion B, the hydrogen concentration in the hydrogen fuel is the lowest; however, the oxidant concentration (oxygen concentration in the air) is the highest, and thus, the rate of hydrogen consumption can be increased.

The connection unit 150 can be modified in various ways. For example, the connection unit 150 can be a flexible hose that connects the holes 146 and 145.

Figure 15:
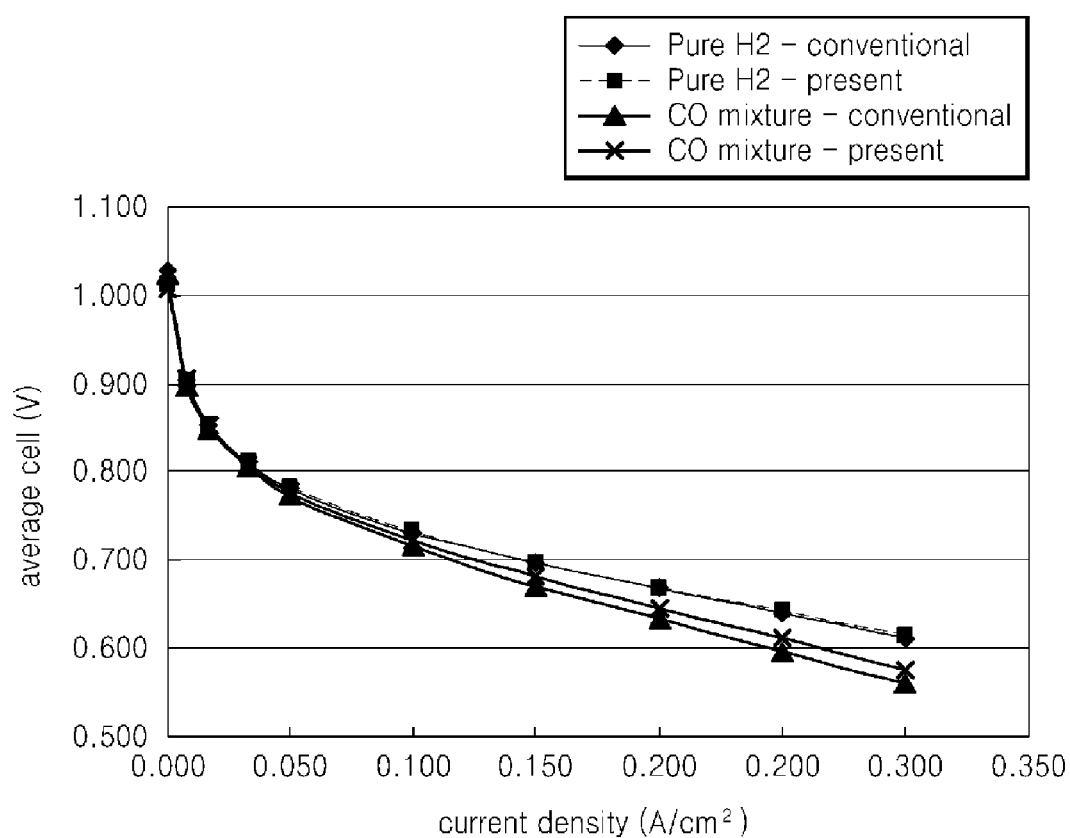
FIG. 15 is a graph showing I-V characteristic curves of a conventional fuel cell, and a fuel cell according to an exemplary embodiment of the present invention.

FIG. 15 is a graph showing I-V characteristic curves of a conventional fuel cell, and a fuel cell according to an exemplary embodiment of the present invention. Table 1 summarizes a portion of data of FIG. 15. For the experiment, pure hydrogen fuel was used, and a fuel including hydrogen mixed with 20% $CO_2$ and 3000 ppm CO was used.

TABLE 1

| Current density (A/cm²) | Cell average voltage (V) | | | | | |
| --- | --- | --- | --- | --- | --- | --- |
| | Pure H₂ case | | | CO mixture (3000 ppm) | | |
| | Conventional | Present Invention | Difference (mV) | Conventional | Present Invention | Difference (mV) |
| 0.1 | 0.7307 | 0.7317 | 1.0 | 0.7160 | 0.7213 | 5.3 |
| 0.2 | 0.6670 | 0.6681 | 1.1 | 0.6333 | 0.6453 | 12.0 |
| 0.3 | 0.6130 | 0.6143 | 1.3 | 0.5593 | 0.5753 | 16.0 |

When the pure hydrogen fuel was used, the I-V characteristic curves of the conventional art and the exemplary embodiment are almost the same. This denotes that there is very little difference in the performance of the fuel cells, since the concentration of the hydrogen fuel in each of the unit cells is uniform. When the hydrogen fuel that contains $CO_2$ and CO is used, it can be noted that the exemplary fuel cell has greatly improved performance.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A fuel cell stack comprising:
    membrane electrode assemblies (MEAs) disposed in a stack;
    an end plate disposed on an end of the fuel cell stack; and
    first bipolar plates and second bipolar plates that are sequentially disposed between the MEAs, the first and second bipolar plates each comprising,
        a main body having opposing first and second surfaces;
        first flow channels to supply a fuel to the MEAs;
        second flow channels to supply an oxidant to the MEAs;
        first and second manifolds connected to ends of the first flow channels;
        third and fourth manifolds connected to ends of the second flow channels; and
        first through fourth through holes that are isolated from the flow channels and the manifolds of their respective bipolar plates, wherein,
    the through holes of the first bipolar plates are connected to the manifolds of the second bipolar plates, and
    the through holes of the second bipolar plates are connected to the manifolds of the first bipolar plates,
    wherein the end plate has a first hole connected to one of the through holes connected to the first flow channels of the second bipolar plates, and a second hole connected to one of the through holes connected to the first flow channels of the first bipolar plates,
    the fuel cell stack further comprises a connection unit on the end plate, to connect the first hole to the second hole, to recirculate the fuel from the first flow channels of the second bipolar plates to the flow channels of the first bipolar plate through the end plate.

2. The fuel cell stack of claim 1, wherein the first and second bipolar plates further comprise connection channels to connect the manifolds to the respective flow channels.

3. The fuel cell stack of claim 2, wherein each of the connection channels comprises:
    a first connection channel that extends from the corresponding manifold, across one of the first and second surfaces;
    a connection channel through hole that connects the first connection channel to the other of the first and second surfaces; and
    a second connection channel that extends from the connection channel through hole, across the other surface, to the corresponding flow channel.

4. The fuel cell stack of claim 1, wherein the fuel flows through the first flow channels of the first bipolar plates in a first direction, and the fuel flows through the first flow channels of the second bipolar plates, in an opposing second direction.

* * * * *